US009189619B2

(12) United States Patent
Banerjee et al.

(10) Patent No.: US 9,189,619 B2
(45) Date of Patent: Nov. 17, 2015

(54) RUNTIME BASED APPLICATION SECURITY AND REGULATORY COMPLIANCE IN CLOUD ENVIRONMENT

(71) Applicant: International Business Machines Corporation, Armonk, NY (US)

(72) Inventors: Pradipta K. Banerjee, Bangalore (IN); Ashish Billore, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 13/675,273

(22) Filed: Nov. 13, 2012

(65) Prior Publication Data

US 2014/0137106 A1 May 15, 2014

(51) Int. Cl.
*G06F 9/00* (2006.01)
*G06F 9/455* (2006.01)
*H04L 29/06* (2006.01)
*G06F 21/52* (2013.01)
*G06F 21/53* (2013.01)

(52) U.S. Cl.
CPC ............ *G06F 21/52* (2013.01); *G06F 9/00* (2013.01); *G06F 21/53* (2013.01); *H04L 63/00* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,440,751 B2 | 10/2008 | Boros | |
| 8,413,147 B2 * | 4/2013 | Shen et al. | 718/1 |
| 8,661,434 B1 * | 2/2014 | Liang et al. | 718/1 |
| 8,875,160 B2 * | 10/2014 | Hunt et al. | 719/319 |
| 2005/0193382 A1 * | 9/2005 | Goring et al. | 717/162 |
| 2008/0046960 A1 * | 2/2008 | Bade et al. | 726/1 |
| 2008/0256225 A1 | 10/2008 | Suh et al. | |
| 2008/0282268 A1 | 11/2008 | Liekens et al. | |
| 2009/0217072 A1 * | 8/2009 | Gebhart et al. | 713/330 |
| 2009/0271498 A1 | 10/2009 | Cable | |
| 2010/0125477 A1 | 5/2010 | Mousseau et al. | |
| 2011/0197197 A1 | 8/2011 | Ni et al. | |
| 2011/0209131 A1 * | 8/2011 | Hohenstein et al. | 717/168 |
| 2011/0247047 A1 | 10/2011 | Loureiro et al. | |
| 2011/0276951 A1 | 11/2011 | Jain | |
| 2012/0005663 A1 | 1/2012 | Burckart et al. | |
| 2012/0102486 A1 | 4/2012 | Yendluri | |
| 2012/0110585 A1 | 5/2012 | Cosentino et al. | |
| 2012/0222025 A1 * | 8/2012 | Pandit | 717/170 |
| 2013/0007216 A1 * | 1/2013 | Fries et al. | 709/218 |
| 2013/0139155 A1 * | 5/2013 | Shah | 718/1 |

(Continued)

OTHER PUBLICATIONS

U.S. Appl. No. 13/777,316, Feb. 26, 2013.
(Continued)

*Primary Examiner* — Abdullah Al Kawsar
(74) *Attorney, Agent, or Firm* — Stephen R. Tkacs; Stephen J. Walder, Jr.; Steven L. Bennett

(57) ABSTRACT

A mechanism is provided in a data processing system for runtime based application security. The application runtime environment executing within a virtual machine on the data processing system receives notification of a change in execution environment for the virtual machine. Responsive to determining the virtual machine is being migrated to a virtualized environment based on the notification of a change in execution environment, the application runtime environment dynamically modifies execution of an application in the application runtime environment, wherein the application comprises a set of application modules.

20 Claims, 6 Drawing Sheets

(56) References Cited

U.S. PATENT DOCUMENTS

2013/0152076 A1* 6/2013 Patel .................................. 718/1
2013/0297769 A1* 11/2013 Chang et al. .................. 709/224
2014/0053226 A1* 2/2014 Fadida et al. ..................... 726/1
2014/0325515 A1* 10/2014 Salmela et al. ................... 718/1

OTHER PUBLICATIONS

U.S. Appl. No. 13/777,325, Feb. 26, 2013.
U.S. Appl. No. 13/675,341, Nov. 13, 2012, 1 page.
"Benefits of Using OSGi", OSGi Alliance, http://www.osgi.org/About/WhyOSGi, printed from the internet Oct. 1, 2012, 3 pages.
Beloglazov, Anton et al., "Energy-Aware Resource Allocation Heuristics for Efficient Management of Data Centers for Cloud Computing", Future Generation Computer Systems, vol. 28, Issue 5, May 2012, pp. 755-768. http://cloudbus.org/papers/Energy-Aware-CloudResourceAllocation-FGCS2012.pdf.
Goiri, Inigo et al., "Energy-aware Scheduling in Virtualized Datacenters", 2010 IEEE International Conference on Cluster Computing, Sep. 20-24, 2010, pp. 58-67. http://personals.ac.upc.edu/jguitart/HomepageFiles/CLUSTER10.pdf.
Gu, Tao et al., "Toward an OSGI-Based Infrastructure for Context-Aware Applications", IEEE http://www.imada.sdu.dk/~gu/publication_files/PC2004-gu.pdf, Pervasive Computing, 2004, pp. 66-74.
Hang, Chen et al., "Research and Application of Distributed OSGi for Cloud Computing", 2010 International Conference on Computational Intelligence and Software Engineering (CiSE), Dec. 10-12, 2010, abstract only, 2 pages. http://ieeexplore.ieee.org/xpl/login.jsp?tp=&arnumber=5676965&url=http%3A%2F%2Fieeexplore.ieee.org%2Fiel5%2F5676124%.
Kim, Kyong H. et al., "Power-aware Provisioning of Cloud Resources for Real-time Services", MGC '09, Proceedings of the 7th International Workshop on Middleware for Grids, Clouds and e-Science Article No. 1, Nov. 30-Dec. 1, 2009, 6 pages. http://www.cloudbus.org/papers/Power-AwareCloud-MCG2009.pdf
Lee, Young C. et al., "Energy Efficient Utilization of Resources in Cloud Computing Systems", The Journal of Supercomputing, vol. 60, No. 2 (2012), pp. 268-280, http://www.springerlink.com/content/600xn06411r48912/.
Schmidt, Holger et al., "OSGi4C: Enabling OSGi for the Cloud", COMSWARE '09 Proceedings of the Fourth International ICST Conference on Communication System Software and Middleware, Jun. 16-19, 2009, 12 pages. http://dl.acm.org/citation.cfm?id=1621910.
www.google.com, sensitive definition, www.google.com/search?q=sensitive&aqs=chrome..69i57j0l5.2712j0j1&sourceid=chrome&es_sm=122&ie=UTF-8, Mar. 31, 2015, 2 pages.

* cited by examiner

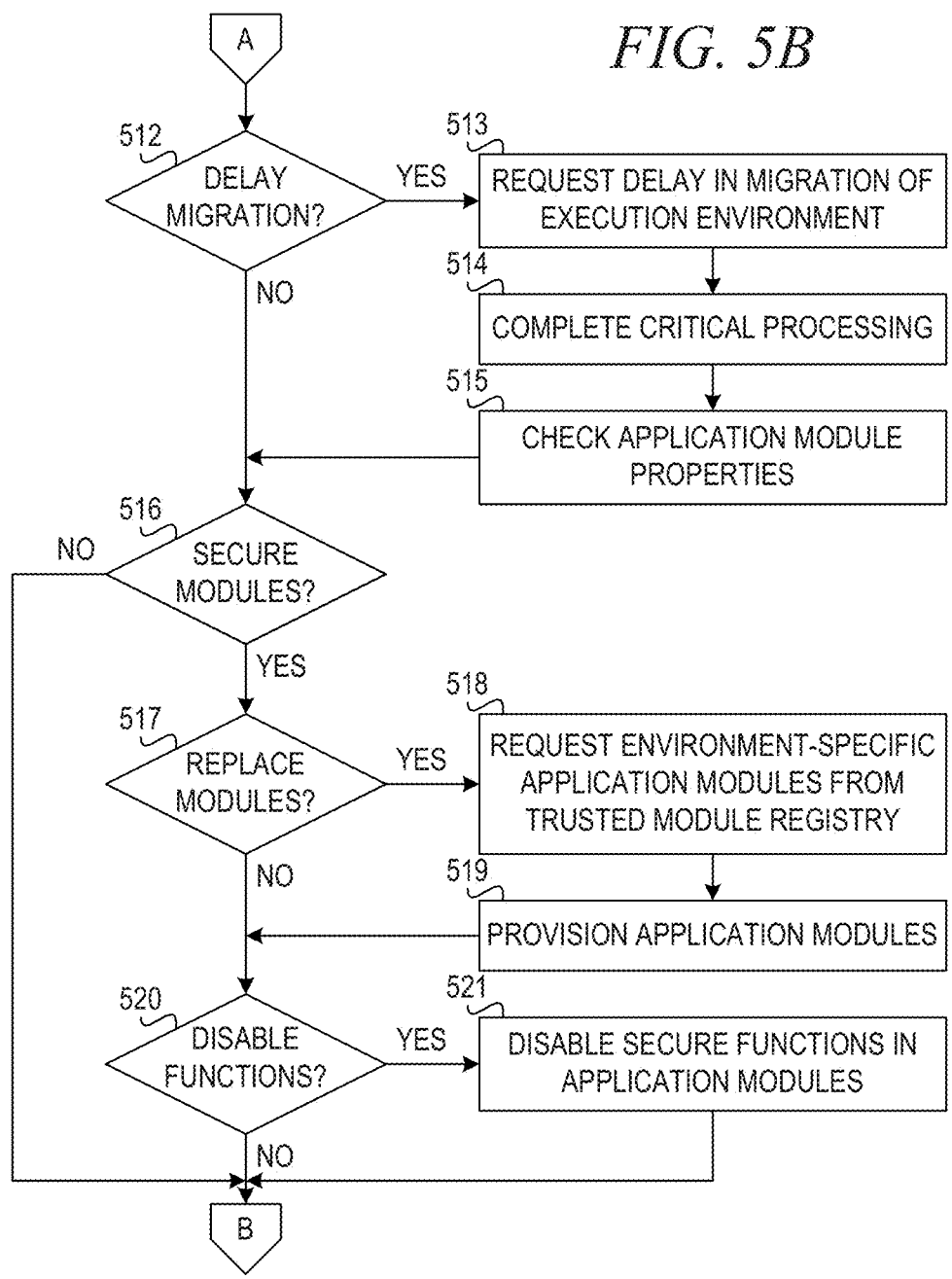

RUNTIME BASED APPLICATION SECURITY AND REGULATORY COMPLIANCE IN CLOUD ENVIRONMENT

BACKGROUND

The present application relates generally to an improved data processing apparatus and method and more specifically to mechanisms for runtime based application security and regulatory compliance in a cloud computing environment.

Cloud computing is the use of computing resources (hardware and software) that are delivered as a service over a network (typically the Internet). Cloud computing entrusts remote services with a user's data, software and computation. Using software as a service, users also rent application software and databases. The cloud providers manage the infrastructure and platforms on which the applications run. End users may access cloud-based applications through a web browser or a light-weight desktop or mobile app while the business software and user data are stored on servers at a remote location.

In the software-as-a-service (SaaS) model, cloud providers install and operate application software in the cloud, and cloud users access the software from cloud clients. The cloud users do not manage the cloud infrastructure and platform on which the application is running. This eliminates the need to install and run the application on the cloud user's own computers, simplifying maintenance and support. What makes a cloud application different from other applications is its elasticity. This can be achieved by cloning tasks onto multiple virtual machines at run-time to meet the changing work demand. Load balancers distribute the work over a set of virtual machines. This process is inconspicuous to the cloud user who sees only a single access point.

An application runtime system or runtime environment is a software component designed to support the execution of computer applications written in some computer language. The application runtime contains implementations of basic low-level commands and may also implement higher-level commands and may support type checking, debugging, and even code generation and optimization.

An application runtime relieves programmers from the burden of writing code for mundane tasks, such as drawing text on the screen or making an Internet connection. It also provides an abstraction layer that hides the complexity or variations in the services offered by the operating system.

SUMMARY

In one illustrative embodiment, a method, in a data processing system, is provided for runtime based application security. The method comprises receiving, by an application runtime environment executing within a virtual machine on the data processing system, notification of a change in execution environment for the virtual machine. The method further comprises responsive to determining the virtual machine is being migrated to a virtualized environment based on the notification of a change in execution environment, dynamically modifying, by the application runtime environment, execution of an application in the application runtime environment, wherein the application comprises a set of application modules.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A and 5B present a flowchart illustrating operation of a mechanism for application runtime based security and regulatory compliance in accordance with an illustrative embodiment.

DETAILED DESCRIPTION

Figure 1:
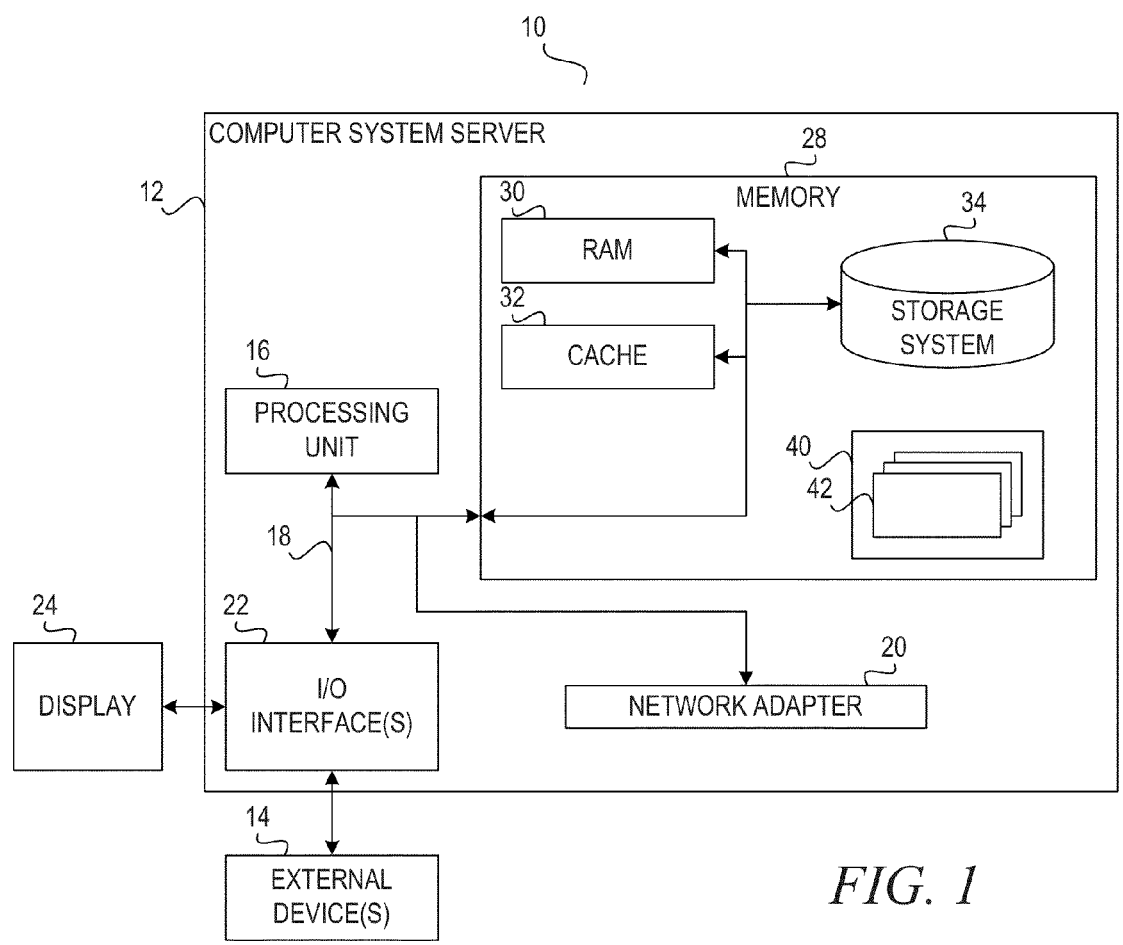
FIG. 1 depicts a cloud computing node according to an illustrative embodiment.

The illustrative embodiments provide a mechanism for runtime based application security and regulatory compliance in a cloud computing environment. The application runtime is notified of its execution environment to allow the application runtime to dynamically modify its behavior. If an application executing in the application runtime environment processes or generates very sensitive data, which is not safe to handle in a virtualized execution environment, the application runtime may selectively disable only those application modules and services that deal with such data in a virtualized environment.

Each application module may have an attribute that indicates whether the module can be run in a virtualized or cloud environment. The application runtime, before loading the application modules, may check the attribute and compare it with runtime environment details. Based on the attribute value, the application runtime can load the module or disable its loading. Additionally, if the application runtime decides to not load a given application module based on its attribute value, the application runtime may query a service registry to get a version of the module with specific functionality suitable for the specific runtime environment, if available. The application runtime may also query a trusted module object registry to deploy application modules that provide needed functionality with enhanced security, for example, as per the changes in the execution environment.

It is understood in advance that although this disclosure includes a detailed description on cloud computing, implementation of the teachings recited. herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least live characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, The components of computer system/ server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
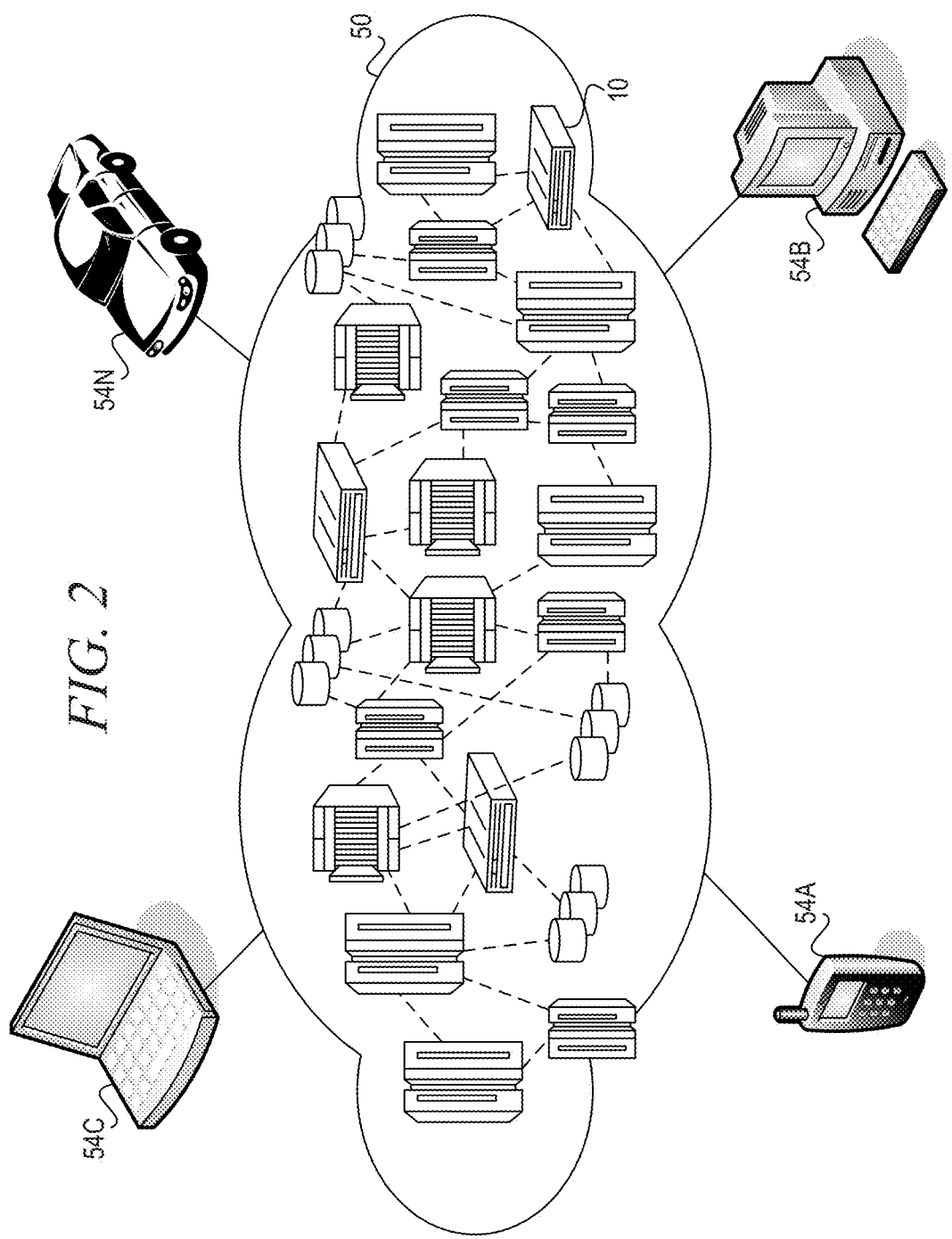
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
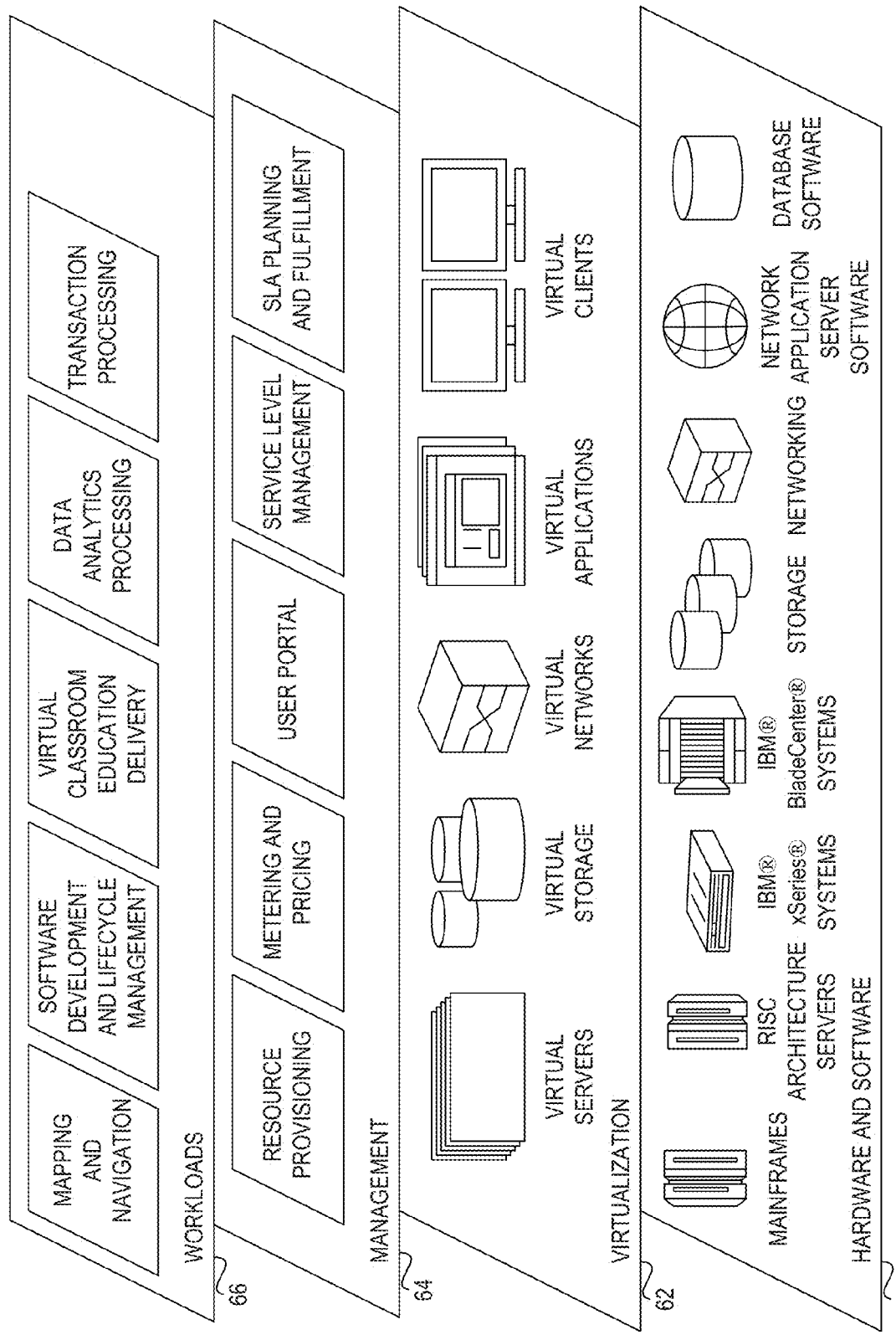
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeriesk® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education deliver; data analytics processing; and transaction processing.

Open Services Gateway Initiative (OSGi™) framework is a module system and service platform for the Java™ programming language that implements a complete and dynamic component model. The OSGi™ framework installs units of resources called "bundles," which are application modules that together make up an application. Applications or bundles can be remotely installed, started, stopped, updated, and uninstalled without requiring a reboot; management of Java™ packages/classes is specified in great detail. Application life cycle management (start, stop, install, etc.) is done via application programming interfaces (APIs) that allow for remote downloading of management policies. The service registry allows bundles to detect the addition of new services, or the removal of services, and adapt accordingly.

Bundles can export services or run processes and have their dependencies managed, such that a bundle can be expected to have its requirements managed by the container (runtime environment). Each bundle can also have its own internal classpath, so that it can serve as an independent unit, should that be desirable. All of this is standard such that any valid OSGi™ bundle can theoretical be installed in any valid OSGi™ container.

With the advent of cloud computing, more and more companies are moving their traditional application runtime-based applications, such as applications in the OSGi™ framework, to cloud environments to reap the benefits of cloud computing. For handling unexpected load during peak periods, many customers exploit hybrid cloud approaches where the application may run in a private cloud (inside a customer's firewall) and additional capacity is sourced from a public cloud. The application is available in both the private cloud and the public cloud. However, moving these traditional applications to a cloud environment raises some unique challenges with respect to security and regulatory compliance.

The most prevalent options for taking care of these security aspects related to application runtime environments when they are migrated to a cloud environment is to provide a greater degree of isolation for the virtual machine (VM) that is supposed to execute these applications, referred to as VM hardening, and to enforce stringent security policies for such VMs and hosts running these security sensitive applications. These approaches have several disadvantages. Increasing isolation between VMs increases complexity of migration of VMs as per cloud policies and dynamic resource requirements, thus reducing flexibility. Providing isolation at VM levels reduces multi-tenancy at a higher level of the stack (i.e., at database level, application level, etc.), reducing the efficient utilization of resources for sharing. These approaches also require additional provisions in terms of setting extra policies, more logging, use of specialized tools for security, etc. at the cloud provider's end to handle such applications, which increases cost of hosting such applications the cloud.

As described above, management layer 64 provides functions of resource provisioning, service level management, security, and so forth. Thus, management layer 64 may provision resources to a virtual machine and an application runtime executing within the virtual machine. Management layer 64 may also migrate a virtual machine to another host, from a dedicated host to a private cloud, from a private cloud to a public cloud, from a public cloud to a private cloud, from a private cloud to a dedicated host, or other combinations of the above. In accordance with an illustrative embodiment, the application runtime is made aware of the fact it is running in a virtualized/cloud environment so that the application runtime can dynamically change its behavior.

Figure 4:
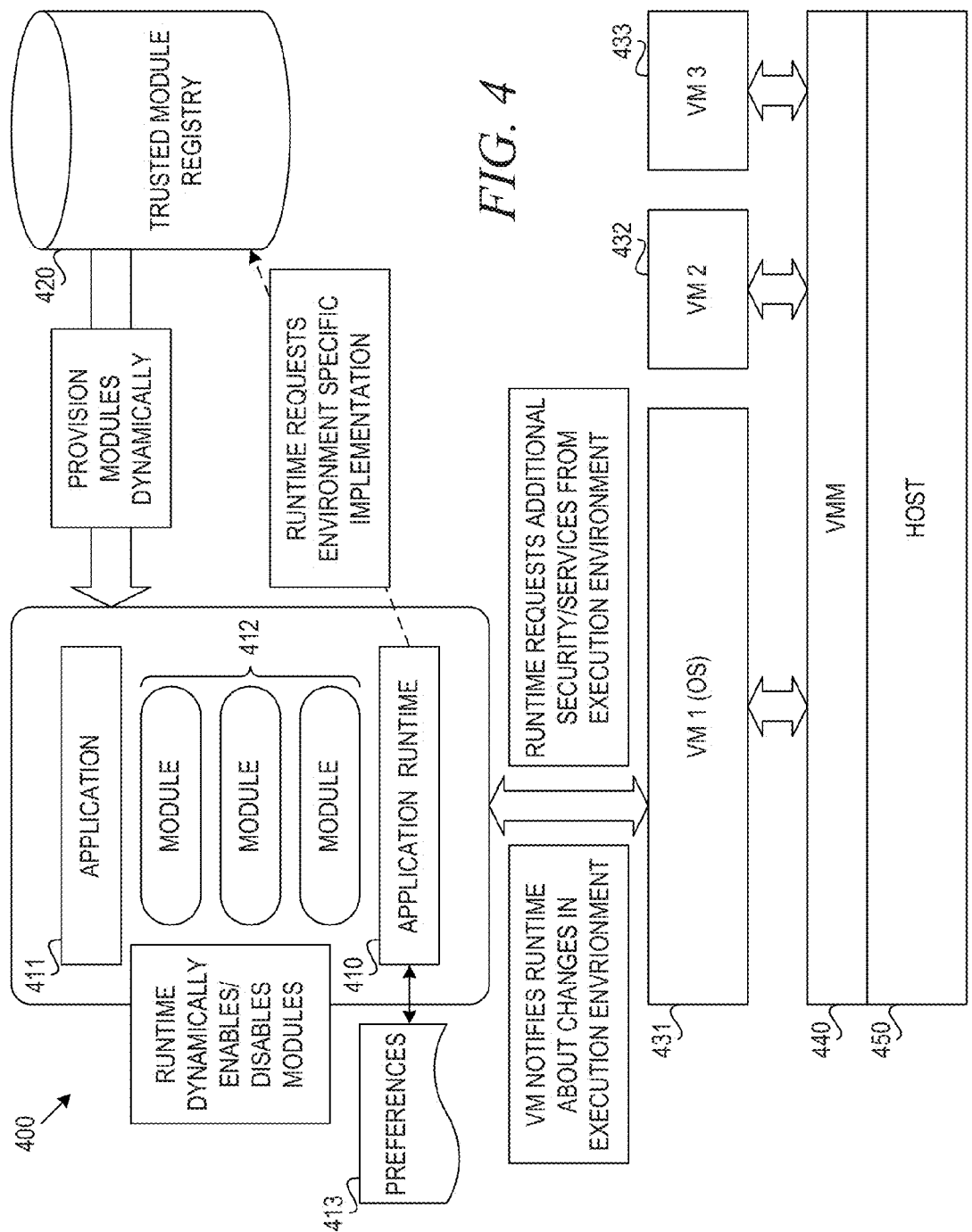
FIG. 4 is a block diagram of a data processing system with application runtime based security and regulatory compliance in accordance with an illustrative embodiment.

FIG. 4 is a block diagram of a data processing system with application runtime based security and regulatory compliance in accordance with an illustrative embodiment. Data processing system 400 comprises host 450 having hardware resources, such as processors, memory, I/O devices, persistent storage devices, etc. Host 450 runs virtual machine monitor (VMM) 440, which virtualizes hardware resources of host 450 to be allocated to virtual machines 431, 432, 433. A virtual machine (VM) is a software implementation of a machine (i.e., a computer) that executes programs like a physical machine. A system virtual machine provides a complete system platform which supports the execution of a complete operating system (OS). VMs may emulate an existing architecture, and are built with the purpose of providing a platform to run programs where having multiple instances of virtual machines lead to more efficient use of computing resource, both in terms of energy consumption as well as cost effectiveness (known as hardware virtualization, the key to cloud computing environment).

VM 1 431 runs application runtime 410, which loads application 411 made up of application modules 412. In accordance with the illustrative embodiment, application runtime 410 gets a notification of its execution environment from VM 1 431 or VMM 440. The notification may identify that application runtime 410 is executing on a physical system, is executing in a virtual environment, or is migration happened or is happening. The notification may identify whether the virtual environment is a private or public cloud. The notification may identify whether the application environment is being migrated from a physical system to a virtual environment or vice versa, from a private cloud to a public cloud or vice versa, etc.

Based on the notification, application runtime 410 may check attributes of application modules 412. The attributes may be specified as metadata of the modules or the service registration attributes of the associated service by the provider module. Application runtime 410 determines whether application modules 412 are sensitive to execution environment or changes to execution environment. In the case of sensitive and secure data handling modules, attributes may be specified and marked with alternate options, such as the following: execute only on physical environment, execute on physical and secure (private) virtual environment, or no attribute specified or execute any (insensitive to execution environment).

For modules that are sensitive to execution environment, the application runtime 410 may make decisions regarding the behavior of application 411. Application runtime 410 may request execution environment to provide enhanced security or defer the migration. Application runtime 410 may seek out secure and environment-specific alternate implementation of sensitive functionality. The application runtime 410 may contact trusted module registry 420 to provision alternate modules that satisfy the security needs of the application and are suitable for the execution environment. The application runtime 410 may temporarily disable sensitive bundles (functionality). If both of the above options fail, application runtime 410 may temporarily deactivate the sensitive bundle and hence the associated functionality until the next notification or event for favorable or compatible execution environment availability or availability of alternate implementation of sensitive modules.

In one embodiment, application engine 410 may perform combinations of the above according to user preferences in preferences data structure 413. That is, preferences data structure 413 may comprise preferences for security and regulatory compliance with respect to provisioning and/or migrating application 411. Preferences 413 may specify whether application 411 must complete functions or services before being migrated. Preferences 413 may specify whether application runtime 410 may disable particular functions or services or whether application runtime 410 must disable particular functions or services when provisioning to or migrating to a virtual environment. Preferences 413 may also specify whether application runtime 410 is permitted to provision alternate modules in application 411 responsive to provisioning to or migrating to a virtual environment. Preferences 413 may also specify whether application 410 is to revert back to the original configuration when migrating back to a physical system or private cloud environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5A:
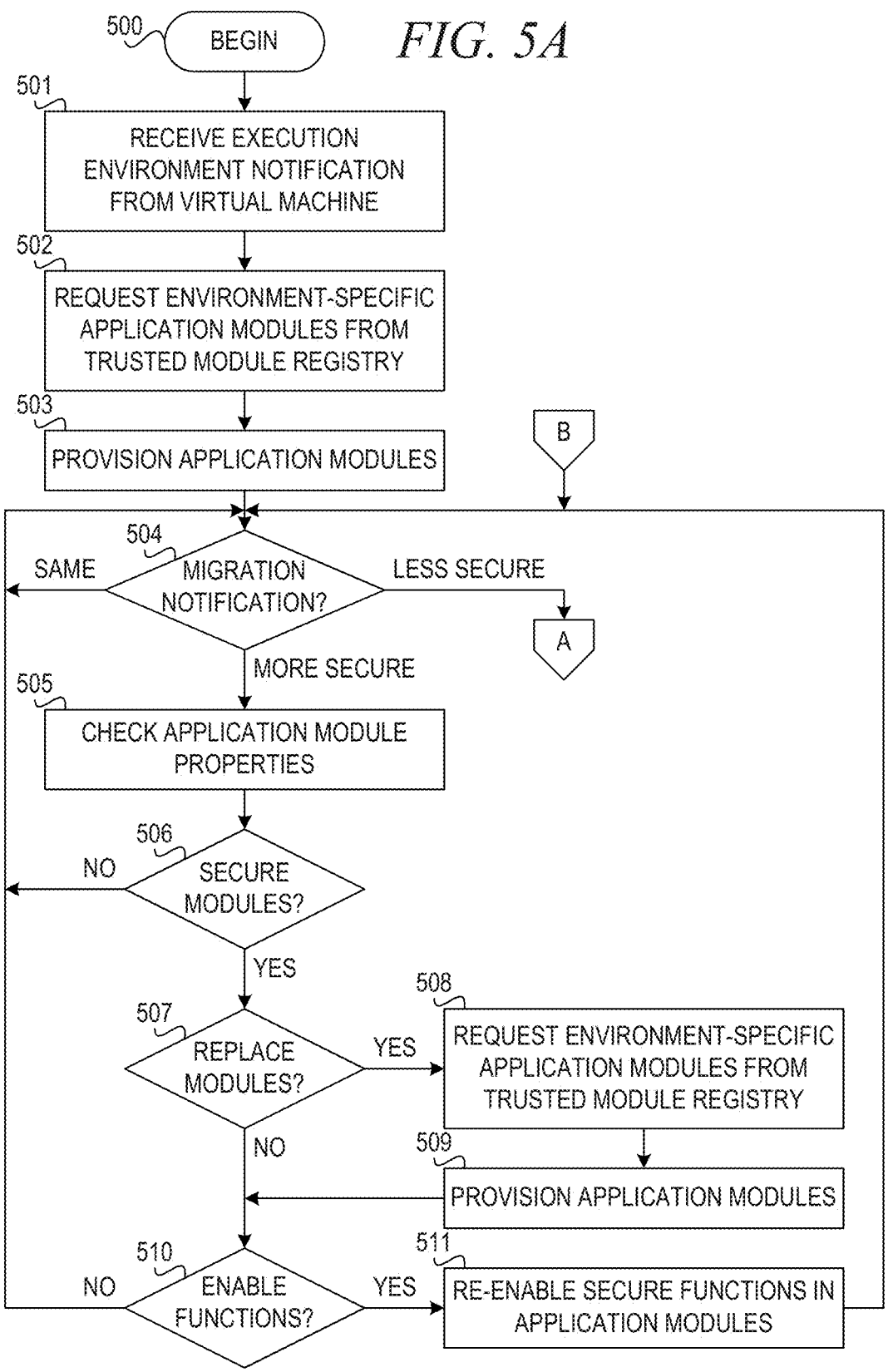

FIGS. 5A and 5B present a flowchart illustrating operation of a mechanism for application runtime based security and regulatory compliance in accordance with an illustrative embodiment. With reference to FIG. 5A, operation begins when provisioning an application in an application runtime (block 500), and the mechanism receives a notification of the execution environment form the virtual machine in which the application runtime executes (block 501). The mechanism requests environment-specific application modules from a trusted module registry (block 502) and provisions the application modules (block 503).

The mechanism then determines whether the application runtime receives a notification indicating migration of the execution environment and determines whether the execution environment to which the application runtime is being migrated is less secure than, more secure than, or the same as the current execution environment (block 504). The execution environment may be more secure if the application runtime is being migrated from a public cloud to a private cloud, from a private cloud to a dedicated physical system, or from a public cloud to a dedicated physical system, for example. The execution environment may be less secure if the application runtime is being migrated from a dedicated physical system to a private cloud, from a private cloud to a public cloud, or from a dedicated physical system to a public cloud, for example. The execution environment may be the same if the application runtime is being migrated from a physical system to another physical system or from one public cloud to another public cloud, for example.

If the mechanism receives a notification and determines the execution environment to which the application runtime is being migrated is the same as the current execution environment in block 504, then the application runtime does not modify the behavior of the application, and operation returns to block 504 to determine whether the application runtime receives a notification indicating migration of the execution environment.

If the mechanism receives a notification and determines the execution environment to which the application runtime is being migrated is more secure than the current environment, the mechanism checks application module properties (block 505). The mechanism determines whether at least one application module is secure, i.e., sensitive to virtual environments (block 506). If the mechanism determines no application modules are sensitive to virtual environments, then operation returns to block 504 to determine whether the application runtime receives a notification indicating migration of the execution environment.

If the mechanism determines at least one application module is sensitive to virtual environments in block 506, then the mechanism determines whether to replace application modules with alternate, environment-specific modules (block 507). The mechanism may determine to replace application modules based on preferences in a preferences data structure or based on whether such alternate modules are available. If the mechanism determines to replace one or more application modules, the mechanism requests environment-specific application modules from a trusted module registry (block 508). The mechanism then provisions the alternate application modules (block 509).

Thereafter, or if the mechanism cannot or does not replace application modules in block 507, the mechanism determines whether to enable functions or services in the application (block 510). The mechanism may determine to re-enable functions or services that were previously disabled based on preferences in a preferences data structure or based on whether the mechanism was able to replace application modules with environment-specific modules. If the mechanism determines to re-enable functions or services, the mechanism re-enables secure functions in the application modules (block 511). Thereafter, or if the mechanism determines to not disable functions or services in block 510, operation returns to block 504 to determine whether the application runtime receives a notification indicating migration of the execution environment.

If the mechanism receives a notification and determines the execution environment to which the application runtime is being migrated is less secure than the current environment in block 504, then turning to FIG. 5B, the mechanism determines whether to request delay of migration (block 512). If the mechanism determines to request delay of migration, the mechanism requests delay in migration of the execution environment (block 513). The mechanism completes critical processing (block 514). Then, the mechanism checks application module properties (block 515).

Thereafter, or if the mechanism does not request delay in migration in block 512, the mechanism determines whether at least one application module is secure, i.e., sensitive to virtual environments (block 516). If the mechanism determines no application modules are sensitive to virtual environments, then operation returns to block 504 in FIG. 5A to determine whether the application runtime receives a notification indicating migration of the execution environment.

If the mechanism determines at least one application module is sensitive to virtual environments in block 516, then the mechanism determines whether to replace application modules with alternate, environment-specific modules (block 517). The mechanism may determine to replace application modules based on preferences in a preferences data structure or based on whether such alternate modules are available. If the mechanism determines to replace one or more application modules, the mechanism requests environment-specific application modules from a trusted module registry (block 518). The mechanism then provisions the alternate application modules (block 519).

Thereafter, or if the mechanism cannot or does not replace application modules in block 517, the mechanism determines whether to disable functions or services in the application (block 520). The mechanism may determine to disable functions or services based on preferences in a preferences data structure or based on whether the mechanism was able to replace application modules with environment-specific modules. If the mechanism determines to disable functions or services, the mechanism disables secure functions in the application modules (block 521). Thereafter, or if the mechanism determines to not disable functions or services in block 520, operation returns to block 504 in FIG. 5A to determine whether the application runtime receives a notification indicating migration of the execution environment.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures, For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for runtime based application security and regulatory compliance in a cloud computing environment. The virtual machine or virtual machine monitor exports platform properties to the application runtime. The virtual machine or virtual machine monitor may also perform dynamic notification of platform property changes to the application runtime. The application specifies security sensitivity as an attribute of application modules. The application runtime has the ability to disable or enable a subset of functionality, request more services from the runtime or dynamically seek environment specific implementations in response to changes in the execution environment. The application runtime may enable or disable loading of application modules based on a combination of platform properties and module security attributes. The application module may also switch a specific module with an alternate version of the same module based on platform properties and module security attributes.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
    receive, by an application runtime environment executing within an operating system in a virtual machine executing within a first execution environment on a data processing system, notification of a change in execution environment for the virtual machine; and
    responsive to determining the virtual machine is being migrated to a second execution environment based on the notification of a change in execution environment, dynamically modify, by the application runtime environment, execution of an application in the application runtime environment by querying a service registry for an alternate version of a given software module with enhanced security and deploying the alternate version of the given software module in the application runtime environment, wherein the application comprises a set of software modules.

2. The computer program product of claim 1, wherein modifying execution of applications in the application runtime environment further comprises disabling functionality of at least one software module within the set of software modules.

3. The computer program product of claim 1, wherein modifying execution of applications in the application runtime environment further comprises disabling at least one module or service executing in the application runtime environment.

4. The computer program product of claim 1, wherein each software module in the set of software modules has a security attribute that indicates whether the software module can be run in a virtualized environment.

5. The computer program product of claim 4, wherein modifying execution of applications in the application runtime environment comprises:
    identifying the given software module within the set of software modules with a security attribute indicating the given software module cannot be run in a virtualized environment;
    querying the service registry for the alternate version of the given software module, wherein the alternate version of the given software module has a security attribute indicating the alternate version of the given software module can be run in a virtualized environment; and
    deploying the alternate version of the given software module in place of the given software module.

6. The computer program product of claim 1, wherein the computer readable program further causes the computing device to:
    responsive to determining the virtual machine has been migrated to a virtualized environment based on the notification of a change in execution environment, requesting, by the application runtime environment, enhanced data isolation from the execution environment.

7. The computer program product of claim 1, wherein the computer readable program further causes the computing device to:
    responsive to determining the virtual machine has been migrated to a virtualized environment based on the notification of a change in execution environment, request, by the application runtime environment, additional security from the execution environment.

8. The computer program product of claim 1, wherein determining the virtual machine is being migrated to the second execution environment comprises determining the virtual machine is being migrated from a private cloud to a public cloud.

9. The computer program product of claim 1, wherein determining the virtual machine is being migrated to the second execution environment comprises determining the virtual machine is being migrated from a physical machine to a virtual environment.

10. The computer program product of claim 1, wherein the computer readable program is stored in a computer readable storage medium in a data processing system and wherein the computer readable program was downloaded over a network from a remote data processing system.

11. The computer program product of claim 1, wherein the computer readable program is stored in a computer readable storage medium in a server data processing system and wherein the computer readable program is downloaded over a network to a remote data processing system for use in a computer readable storage medium with the remote system.

12. An apparatus, comprising:
    a processor; and
    a memory coupled to the processor, wherein the memory comprises instructions which, when executed by the processor, cause the processor to:
    receive, by an application runtime environment executing within an operating system in a virtual machine executing within a first execution environment on a data processing system, notification of a change in execution environment for the virtual machine; and responsive to determining the virtual machine is being migrated to a second execution environment based on the notification of a change in execution environment, dynamically modify, by the application runtime environment, execution of an application in the application runtime environment by querying a service registry for an alternate version of a given software module with enhanced security and deploying the alternate version of the given software module in the application runtime environment, wherein the application comprises a set of software modules.

13. The apparatus of claim 12, wherein modifying execution of applications in the application runtime environment further comprises disabling functionality of at least one software module within the set of software modules.

14. The apparatus of claim 12, wherein modifying execution of applications in the application runtime environment further comprises disabling at least one module or service executing in the application runtime environment.

15. The apparatus of claim 12, wherein each software module in the set of software modules has a security attribute that indicates whether the software module can be run in a virtualized environment.

16. The apparatus of claim 15, wherein modifying execution of applications in the application runtime environment comprises:

identifying the given software module in the set of software modules with a security attribute indicating the given software module cannot be run in a virtualized environment;

querying the service registry for the alternate version of the given software module, wherein the alternate version of the given software module has a security attribute indicating the alternate version of the given software module can be run in a virtualized environment; and deploying the alternate version of the given software module in place of the given software module.

17. The apparatus of claim 12, wherein the instructions further cause the processor to:

responsive to determining the virtual machine has been migrated to a virtualized environment based on the notification of a change in execution environment, requesting, by the application runtime environment, enhanced data isolation from the execution environment.

18. The apparatus of claim 12, wherein the instructions further cause the processor to:

responsive to determining the virtual machine has been migrated to a virtualized environment based on the notification of a change in execution environment, requesting, by the application runtime environment, additional security from the execution environment.

19. The apparatus of claim 12, wherein determining the virtual machine is being migrated to the second execution environment comprises determining the virtual machine is being migrated from a private cloud to a public cloud.

20. The apparatus of claim 12, wherein determining the virtual machine is being migrated to the second environment comprises determining the virtual machine is being migrated from a physical machine to a virtual environment.

* * * * *